(12) United States Patent
Akita et al.

(10) Patent No.: US 8,968,835 B2
(45) Date of Patent: Mar. 3, 2015

(54) METHOD FOR HEATING A FIBER-REINFORCED POLYMER ARTICLE

(75) Inventors: Yasuhiro Akita, Woluwe-ST.-Lambert (BE); Andrew Willett, Etterbeek (BE)

(73) Assignee: Toyota Motor Europe NV/SA, Brussels (BE)

( * ) Notice: Subject to any disclaimer, the term of this patent is extended or adjusted under 35 U.S.C. 154(b) by 294 days.

(21) Appl. No.: 13/498,421

(22) PCT Filed: May 4, 2011

(86) PCT No.: PCT/EP2011/057160
§ 371 (c)(1),
(2), (4) Date: Mar. 27, 2012

(87) PCT Pub. No.: WO2012/149972
PCT Pub. Date: Nov. 8, 2012

(65) Prior Publication Data
US 2012/0280182 A1    Nov. 8, 2012

(51) Int. Cl.
*B05D 3/06* (2006.01)
*B29C 35/08* (2006.01)
*B29C 35/04* (2006.01)
*B29C 70/88* (2006.01)

(52) U.S. Cl.
CPC ........... *B29C 35/0805* (2013.01); *B29C 35/041* (2013.01); *B29C 70/885* (2013.01); *B29C 2035/0855* (2013.01)
USPC ...................................................... 427/508

(58) Field of Classification Search
CPC .. B29C 35/02; B29C 35/0805; B29C 70/882; B29C 71/04; B29C 2035/0855
USPC .......................................................... 427/508
See application file for complete search history.

(56) References Cited

U.S. PATENT DOCUMENTS

| | | | |
|---|---|---|---|
| 2,972,780 A | | 2/1961 | Boonstra |
| 5,284,701 A | * | 2/1994 | Hamon ........................... 442/73 |
| 6,103,812 A | * | 8/2000 | Wei et al. ...................... 524/496 |
| 7,056,466 B2 | * | 6/2006 | Wang et al. ................... 264/405 |
| 2003/0005933 A1 | * | 1/2003 | Izuchukwu ............... 128/205.22 |
| 2008/0023130 A1 | | 1/2008 | Gomez et al. |
| 2008/0237917 A1 | * | 10/2008 | Richards ................... 264/171.28 |
| 2010/0289188 A1 | | 11/2010 | Graeber |

FOREIGN PATENT DOCUMENTS

| | | |
|---|---|---|
| GB | 2 413 301 A | 10/2005 |
| JP | 02-182438 A | 7/1990 |
| JP | H5-79208 B2 | 11/1993 |
| JP | 11-300766 A | 11/1999 |

OTHER PUBLICATIONS

International Search Report mailed Jan. 20, 2012 of PCT/EP2011/057160 & Written Opinion.

* cited by examiner

*Primary Examiner* — Elena T Lightfoot
(74) *Attorney, Agent, or Firm* — Kenyon & Kenyon LLP

(57) ABSTRACT

The present invention concerns a method for heating a polymer article reinforced with electrically conductive embedded fibers, comprising the steps of applying an outer, electrically non-conductive coating so as to cover exposed electrically conductive fibers, and irradiating the coated, fiber-reinforced thermosetting polymer article with microwaves within a predetermined frequency range so as to heat up the coated, fiber-reinforced thermosetting polymer article by dielectric heating.

11 Claims, 1 Drawing Sheet

FIG.1
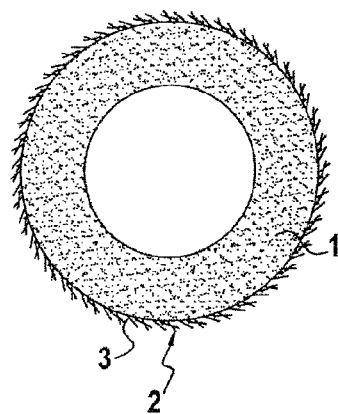
FIG.2
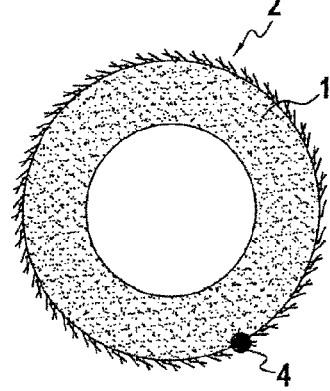
FIG.3B
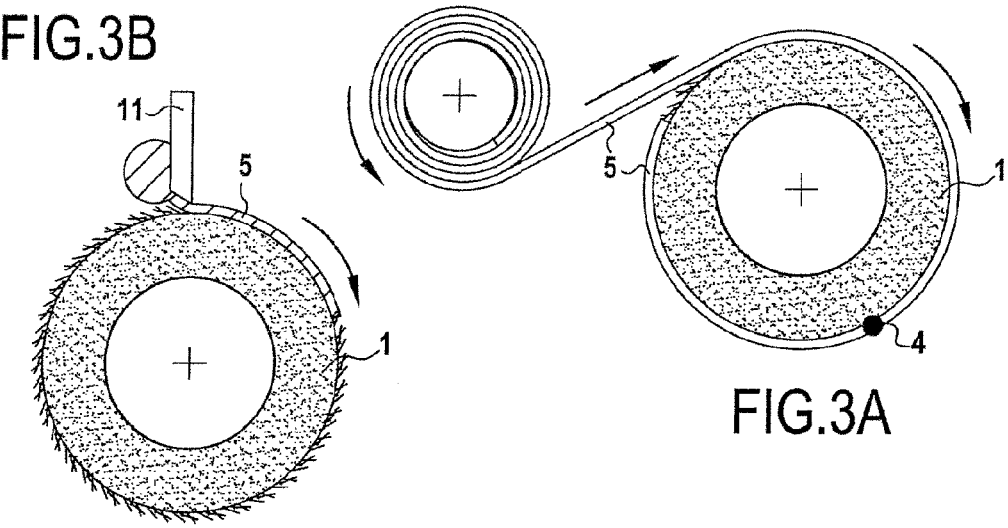
FIG.3A
FIG.3C
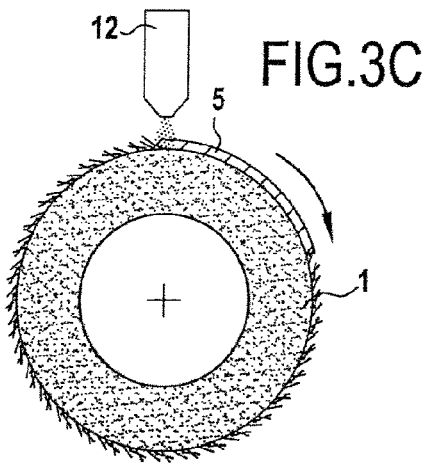
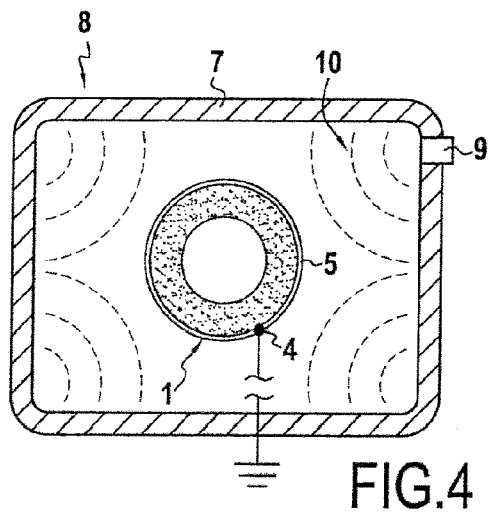
FIG.4

METHOD FOR HEATING A FIBER-REINFORCED POLYMER ARTICLE

This is a 371 national phase application of PCT/EP2011/057160 filed 4, May 2011, the contents of which are incorporated herein by reference.

TECHNICAL FIELD

The disclosure relates to a method for heating a polymer article reinforced with electrically conductive embedded fibers.

BACKGROUND

Composite materials combine two or more distinct materials with complementary qualities, such as for instance lightness and strength. Various composite materials are known to the skilled person. For instance, honeycomb sandwiches, combining a honeycomb core and two facing panels, in metal, polymer and/or other materials, have long been used in a number of different applications, and in particular for structural elements in the aerospace and shipbuilding fields. Other composite materials combine a solid matrix of a first material with reinforcing elements, usually fibers, of a second material embedded in the matrix. Such composite materials include ceramic matrix composites (CMC), metal matrix composites (PMC) and polymer matrix composites (PMC). Advances in various fields, such as nanotechnology, have expanded the use of these materials to many technical fields, such as power generation, construction, medical implants and prostheses, transportation, etc. This has led to further competition to increase the performances and reduce the drawbacks of these materials.

Among composite materials, polymer matrix composites (PMC) and in particular fiber-reinforced polymers (FRP), such as, among others, carbon-, glass- and/or aramid-fiber reinforced polymers are particularly widespread. Fiber-reinforced polymers offer an advantageous combination of the properties, in particular the mechanical properties, of a polymer matrix and reinforcing fibers embedded in said polymer matrix. Both thermosetting and thermoplastic polymers are commonly used as matrices in such fiber-reinforced polymers. To produce a fiber-reinforced thermosetting polymer article, the fibers are first impregnated with a resin, i.e. a prepolymer in a soft solid or viscous state, shaped into a given form, usually by molding, and the resin is then irreversibly hardened by curing. During curing, the prepolymer molecules crosslink with each other to form a three-dimensional network. To initiate or at least accelerate this crosslinking reaction, the resin is usually energized using thermal heat transfer mechanisms and/or electromagnetic excitation. On the other hand, fiber-reinforced thermoplastic polymer composites can be produced by heating a thermoplastic so that it melts and impregnates reinforcing fibers. The production of fiber-reinforced thermoplastic polymer articles normally involves a heating stage in which the material is heated in order to soften the thermoplastic and enable processes such as forming or handling. Some preforms for fiber-reinforced thermoplastic polymer articles include a so-called comingled fabric in which the reinforcing fibers are mixed with thermoplastics. In this case the impregnation step takes place during forming.

Microwave heating technology is the most promising candidate for curing, drying, thermal treatment, inspection, post-consolidation, repair and a number of other processes for composite materials. A method for heating a fiber-reinforced polymer article using microwaves was disclosed in Japanese patent publication JP H5-79208 B2. According to this first prior art method, the fiber-reinforced polymer article is held in a mold made of a similar material with substantially the same dielectric properties. The mold containing the fiber-reinforced polymer is irradiated with microwaves, whose energy is converted into heat by both the mold and the fiber-reinforced polymer inside it. However, in this method, since the mold absorbs part of the microwave radiation, the dielectric heating of the fiber-reinforced polymer article may not be sufficiently homogeneous. In particular, in a thick-walled hollow article such as a pressure tank, the inner layers of the article could be insufficiently heated as a result.

Another method for heating up a fiber-reinforced polymer article using microwaves was disclosed in Japanese patent application Laid-Open JP H11-300766 A. According to this second prior art method, the fiber-reinforced polymer article is held in a mold made of a material that is substantially transparent to microwaves. In this method, the dielectric heating by the microwave radiation is substantially limited to the fiber-reinforced polymer, rather than the mold. However, this method also has the potential drawback of insufficiently homogeneous heating, in particular in thick-walled hollow articles.

To facilitate the penetration of the microwave radiation into the thick-walled article, it may be considered to dispense with the mold. However, when the fiber-reinforced polymer article has a high fiber-to-matrix ratio, a number of the embedded fibers, and in particular loose fiber ends, may be exposed. If the fibers are electrically conductive, as for instance carbon fibers are, the currents induced in the fibers by the microwave radiation during microwave curing will generate electric sparks and arcs, which can lead to local charring or even fire.

SUMMARY

A first object of a method according to the present disclosure is that of preventing electric sparks on the surface of a polymer article reinforced with electrically conductive embedded fibers during microwave heating.

Accordingly, in a first aspect, a method for heating a polymer article reinforced with electrically conductive embedded fibers comprises the steps of applying an outer, electrically non-conductive coating so as to cover exposed electrically conductive fibers, and irradiating the coated, fiber-reinforced polymer article with microwaves within a predetermined frequency range. The microwave radiation heats up the article by dielectric heating of the polymer and/or by resistive heating of the fibers by induced currents. Since the electrically non-conductive coating covers the exposed electrically conductive fibers, it insulates them and prevents electrical discharges even when the microwave radiation induces currents in these fibers. By "electrically non-conductive", it is understood, in the context of the present disclosure, that the coating material prevents any noticeable electric current at the voltage levels normally encountered in this coating during the microwave irradiation step.

Nevertheless, according to a second aspect, in order to prevent local charge buildups in the fiber-reinforced polymer article, an electric terminal is connected to an outer surface of the fiber-reinforced polymer article before the step of applying an outer coating, and said electric terminal is earthed during the step of irradiating with microwaves.

According to a third aspect, the electrically conductive fibers comprise carbon fibers, which offer a particularly high stiffness.

According to a fourth aspect, to offer an adequate insulation of the exposed fibers without using an excessive amount of coating material, the outer coating has a thickness between 0.5 and 10 mm.

According to a fifth aspect, the outer coating comprises a polymer. This polymer can comprise a thermoplastic polymer, such as, for example, a fluoropolymer, a silicone, a polystyrene, a polyethylene, and/or a polypropylene, which present a particularly low microwave absorbance. This polymer can also comprise a thermosetting polymer, such as, for example, an epoxy resin, alternatively or in combination with a thermoplastic polymer.

According to a sixth aspect, the outer coating comprises fibers.

According to a seventh aspect, the outer coating has a dielectric loss factor not greater than 0.2 at the frequency range of the microwaves, so as not to absorb a significant amount of the microwave radiation used for heating up the fiber-reinforced thermosetting polymer article.

According to a ninth aspect, the fiber-reinforced thermosetting polymer article is a high-pressure gas tank. Such a thick-walled fiber-reinforced polymer article can be cured in a particularly efficient manner by microwaves.

The fiber-reinforced polymer article may comprise a thermosetting polymer matrix or a thermoplastic polymer matrix. Accordingly, the present disclosure also relates to a fiber-reinforced thermoset polymer article cured by a method according to any one of these aspects, or to a fiber-reinforced thermoplastic polymer article formed according to any one of these aspects. A fiber-reinforced thermoset polymer article cured by such a method may comprise a plurality of co-cured parts. Analogously, a fiber-reinforced thermoplastic polymer article formed by such a method may comprise a plurality of parts bonded or joined together by the softened thermoplastic as it is formed.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of is the following detailed description of various embodiments in connection with the accompanying drawings, in which:

FIG. 1 is a schematic drawing of a polymer article reinforced with electrically conductive embedded fibers;

FIG. 2 is a schematic drawing of a first step in a first embodiment of a method for heating the polymer article of FIG. 1;

FIG. 3A is a schematic drawing of a second step in the same method;

FIG. 3B is a schematic drawing of an alternative second step in a first variation of the same method;

FIG. 3C is a schematic drawing of an alternative second step in a second variation of the same method;

FIG. 4 is a schematic drawing of a third step in the same method.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

All numeric values are herein assumed to be preceded by the term "about", whether or not explicitly indicated. The term "about" generally refers to a range of numbers that one of skill in the art would consider equivalent to the recited value (i.e. having the same function or result). In many instances, the term "about" may be indicative as including numbers that are rounded to to the nearest significant figure.

Any recitation of numerical ranges by endpoints includes all numbers within that range (e.g., 1 to 5 includes a.o. 1, 4/3, 1.5, 2, e, 2.75, 3, n, 3.80, 4, and 5).

Although some suitable dimension ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar articles in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

FIG. 1 illustrates schematically a fiber-reinforced polymer article, in this particular case a high-pressure gas tank 1, formed by a still-uncured thermosetting polymer matrix with electrically conductive embedded fibers, specifically in this case carbon fibers 2. Such an article may be formed, for instance by a filament winding method in which resin-impregnated fibers are wound around a rotating mandrel. As the fiber-to-matrix ratio is comparatively high, with the carbon fibers 2 representing for instance more than 50% of the total volume fraction (Vf) of the article, some of these carbon fibers 2 emerge from the outer surface 3 of the uncured high-pressure gas tank 1. The thermosetting polymer may be in particular an epoxy resin, but other types of thermosetting polymers, such as, for example, polyimides, may be considered by the skilled person depending on the circumstances.

FIG. 2 shows a first step of a method for heating and curing the high-pressure gas tank 1, during which an electric terminal 4 is connected to the outer surface 3 and emerging carbon fibers 2 of the uncured high-pressure gas tank 1.

In the subsequent second step, shown in FIG. 3A, an outer coating 5 is applied onto the outer surface 3 and emerging carbon fibers 2 of the uncured high-pressure gas tank 1.

In this second step, the uncured high-pressure gas tank 1 is wrapped in a thin film 6, so as to form an outer coating 5 covering the exposed carbon fibers 2. The material of this film 6 and outer coating 5 is electrically non-conductive and presents a low dielectric loss factor $\epsilon_r{''}$ at a microwave frequency that is going to be used afterwards for curing the thermosetting polymer of the high-pressure gas tank 1. This dielectric loss factor $\epsilon_r''$ of the outer coating material may preferably be lower than 0.2. This material can thus be chosen among various thermoplastic polymer materials such as fluoropolymers, silicones, polystyrenes, polyethylenes, polypropylenes and/or mixtures thereof. In combination, or alternatively to such a polymer, non-conductive fibers, such as woven and/or non-woven glass fibers can be used to form the coating 5. These fibers may be pre-impregnated with a thermosetting polymer, and in particular the same thermosetting polymer of the high-pressure gas tank 1, to improve their adhesion to the outer surface 3. However, they may alternatively be laid in a dry state over the outer surface 3 of the uncured high-pressure gas tank 1.

To ensure adequate electrical insulation of the carbon fibers 2, without using an excessive amount of isolating material, the thickness of this outer coating 5 may be in a range from 0.5 to 10 mm. Care will be taken to maintain external access to the electric terminal 4.

In a third step, illustrated in FIG. 4, the uncured, coated high-pressure gas tank 1, is received in an enclosure 7 of a microwave curing device 8 with a microwave emitter 9, such as a cavity magnetron. The electric terminal 4 is connected to Earth, and the microwave emitter emits microwaves 10, that is, is electromagnetic radiation in the 300 MHz-300 GHz frequency range, and preferably in an ISM (industrial, scientific, and medical) frequency band, such as those around 915 MHz and 2.45 GHz. This microwave radiation 10 is substantially confined within the enclosure 7 and directly heats up the tank 1, both through dielectric heating of the thermosetting polymer matrix and through resistive heating of the reinforcing embedded carbon fibers 2 by induced currents.

The absorption of electromagnetic radiation and its conversion into heat in a given material depends from its so-called dielectric loss factor $\epsilon_r''$, that is, the product of the relative dielectric constant $\epsilon_r'$ of the material and the tangent of its dielectric loss angle $\delta$, at the frequency of the electromagnetic radiation, and this according to the following equation:

$$P_d = \omega E^2 \epsilon_0 \epsilon_r'' = \omega E^2 \epsilon_0 \epsilon_r' \tan \delta$$

wherein $P_d$ represents the dissipated power, $\omega$ the angular frequency of the electromagnetic radiation, E the electrical field strength and $\epsilon_0$ the permittivity of free space (approximately $8.854 \cdot 10^{-12}$ F/m).

Because of absorption, the electromagnetic radiation is attenuated as it travels through a material. This attenuation a follows this second equation:

$$\alpha = \frac{\omega}{c} \sqrt{\frac{\epsilon_r'(\sqrt{1|\tan^2 \delta\ 1})}{2}}$$

wherein c represents the speed of light. Since $\tan \delta \ll 1$, the attenuation $\alpha$ can also be approximated as:

$$\alpha \approx \frac{\omega \sqrt{\epsilon_r'} \tan \delta}{2c}$$

Thus, an outer coating 5 from a material with a dielectric loss factor $\epsilon_r''$, and in particular a dielectric loss angle $\delta$, significantly lower than those of the thermosetting polymer of the high-pressure gas tank 1 at the frequency of the microwave radiation 10, will not significantly attenuate the microwave radiation 10 reaching the high-pressure gas tank 1. Consequently, the energy of the microwave radiation 10 will be efficiently used to heat up and cure the thermosetting polymer of the high-pressure gas-tank 1. Nevertheless, the electrically insulating outer coating will effectively prevent electric arcs and sparks from the carbon fibers 2.

In a first variation of this first embodiment, the outer coating 5 is not formed by wrapping, but by spreading onto the outer surface 3 of the high-pressure gas tank 1 using a coater blade 11, as shown in FIG. 3B. As in the first embodiment, the material of this outer coating 5 is electrically non-conductive and presents a low dielectric loss factor $\epsilon_r''$, preferably below 0.2, at a microwave frequency that is going to be used afterwards for curing the thermosetting polymer of the high-pressure gas tank 1. This material can thus be chosen among various thermoplastic polymer materials such as fluoropolymers, silicones, polystyrenes, polyethylenes, polypropylenes and/or mixtures thereof. In combination, or alternatively to such a thermoplastic polymer, a thermosetting polymer, such as an epoxy, polyimide and/or a mixture thereof may also be used.

In a second variation of the first embodiment, the outer coating 5 is not formed by wrapping, or spreading, but by spraying onto the outer surface 3 of the high-pressure gas tank 1 using a spray nozzle 12, as shown in FIG. 3C. As in the first embodiment, the material of this outer coating 5 is electrically non-conductive and presents a low dielectric loss factor $\epsilon_r''$, preferably below 0.2, at a microwave frequency that is going to be used afterwards for curing the thermosetting polymer of the high-pressure gas tank 1.

While in the first embodiment and the abovementioned variations the polymer matrix of the fiber-reinforced polymer article to be heated is a thermosetting polymer matrix, and the purpose of heating the fiber-reinforced polymer article is to cure this thermosetting polymer, in an alternative embodiment this heating method may be used to heat a fiber-reinforced polymer article with a thermoplastic polymer matrix. This may be done with is the purpose of fusing the thermoplastic polymer matrix to the reinforcing fibers. For instance, the article may have been formed by winding around a mandrel the reinforcing fibers together with strands of the thermoplastic polymer that is to form the polymer matrix. By heating the article, the strands of thermoplastic polymer will at least partially melt and flow, fusing around the reinforcing fibers and with them to form a continuous or nearly continuous matrix in which the reinforcing fibers will be embedded.

Those skilled in the art will recognize that the present invention may be manifested in a variety of forms other than the specific embodiments described and contemplated herein. In particular, various types of fiber-reinforced thermosetting polymer articles other than the illustrated high-pressure gas tank 1 may be cured with this method, and other types of electrically-conductive fibers other than carbon fibers may be embedded in the polymer to reinforce it. Accordingly, departure in form and detail may be made without departing from the scope of the present invention as described in the appended claims.

The invention claimed is:

1. A method for heating a polymer article reinforced with electrically conductive embedded fibers, comprising the steps of:
    applying an outer, electrically non-conductive coating so as to cover exposed electrically conductive fibers; and
    irradiating the coated, fiber-reinforced polymer article with microwaves within a predetermined frequency range, wherein an electric terminal is connected to an outer surface of the fiber-reinforced polymer article before applying the outer coating, and said electric terminal is earthed during the step of irradiating with microwaves.

2. The method according to claim 1, wherein the electrically conductive fibers comprise carbon fibers.

3. The method according to claim 1, wherein the outer coating has a thickness between 0.5 and 10 mm.

4. The method according to claim 1, wherein the outer coating comprises a polymer.

5. The method of claim 4, wherein said coating polymer comprises at least one of the following thermoplastic polymers: a fluoropolymer, a silicone, a polystyrene, a polyethylene, and/or a polypropylene.

6. The method of claim 4, wherein the coating polymer comprises a thermosetting epoxy resin.

7. The method according to claim 1, wherein the outer coating comprises fibers.

8. The method according to claim 1, wherein the outer coating has a dielectric loss factor not greater than 0.2 at the frequency range of the microwaves.

9. The method according to claim 1, wherein the fiber-reinforced polymer article is a high-pressure gas tank.

10. The method according to claim 1, wherein the polymer article comprises a thermosetting polymer matrix.

11. The method according to claim 1, wherein the fiber-reinforced polymer article comprises a thermoplastic polymer matrix.

* * * * *